Patented Aug. 17, 1948

2,447,440

UNITED STATES PATENT OFFICE 2,447,440

AMINO SUBSTITUTED ARYL GUANAMINES

Jack Theo Thurston, Cos Cob, Conn., assignor to American Cyanamid Company, New York, N. Y., a corporation of Maine No Drawing. Application August 30, 1941, Serial No. 409,141

6 Claims. (Cl. 260—249.5)

This invention relates to amino-substituted aryl guanamines and to methods of making them. Some unsubstituted 2-aryl guanamines have been prepared by processes which are rather expensive and cumbersome; an example of such a product is benzoguanamine. Some unsubstituted aryl guanamines have a restricted utility as when they are condensed with formaldehyde to form resins, the resins are uncolored, and hence compete with other amino plastics which can be made cheaper.

According to the present invention, I have found that amino-substituted aryl guanamines can be prepared, and these compounds, in addition to other uses, may in most cases be diazotized, where the amine is a primary amine, and, coupled to a suitable coupling component, react to form azo dyes in which the guanamine forms a part of the dye molecule. When resins are made from such guanamines, the resin itself is colored and opens an important new field for colored plastics and coating compositions.

While the present invention is not limited to any particular method of making the amino-substituted aryl guanamines, I have found that a most effective method is to react a biguanide with an ester of the corresponding amino-substituted aromatic carboxylic acid. This process proceeds smoothly, in many cases without the addition of a condensing agent, and in some cases where the reaction is slow, it may be accelerated by the addition of a condensing agent such as a metal alkoxide. In the present case I do not claim broadly the use of metal alkoxides as condensing agents in the production of guanamines, but only claim the use of such condensing agents in conjunction with the production of the amino-substituted guanamines which form the primary subject matter of the present invention.

Some of the amino-substituted guanamines of the present invention are not diazotizable because the amino groups are not primary, but nevertheless form dyes because of the chromophoric nature of the amino-substituted aromatic radical. Examples of such radicals are aminotriphenyl methane radicals, rhodamine radicals, and the like. These compounds, as in the case of the azo dyes, are capable of forming colored resins in which the color is a part of the resin molecule.

Among the cheapest and most important amino-substituted aryl guanamines of the present invention are those in which the triazine ring contains two unsubstituted amino groups. However, the invention is not limited to such guanamines but also includes N-substituted guanamines which can easily be made by substituting for biguanide the corresponding substituted biguanide, for example phenyl biguanide and allyl biguanide.

The invention will be illustrated in greater detail in conjunction with the following specific examples which illustrate production of typical amino-substituted aryl guanamines. The parts are by weight.

EXAMPLE 1

4-aminobenzoguanamine

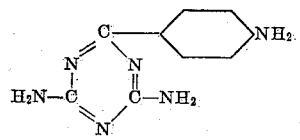

Fifty-eight parts of ethyl 4-aminobenzoate were mixed at room temperature with 30.3 parts of biguanide dissolved in 200 parts of methanol, preferably the solid ester was added to the solution of the biguanide. After thoroughly mixing at room temperature, the mixture was allowed to stand until precipitation was complete, which took some ten days. The guanamine was recrystallized from water in the form of small colorless plates, and had a melting point of 206° C. The yield was about 37%.

The reaction was repeated except that a molecular equivalent of sodium methylate was added. This reduced reaction time to three days and increased the yield to 67%.

EXAMPLE 2

4-acetylaminobenzoguanamine

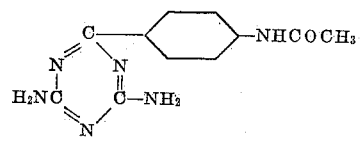

To 10.1 parts of biguanide dissolved in about 65 parts of methanol were added 20.7 parts of the ethyl ester of 4-acetylaminobenzoic acid. The mixture was allowed to stand until precipitation of the guanamine was complete. The product was then dissolved in ethanol, diluted with a large volume of water, and on standing, small colorless plates melting at 268° crystallized from the solution.

EXAMPLE 3

2,7-diethylamino-9-xanthenyl-o-benzoguanamine

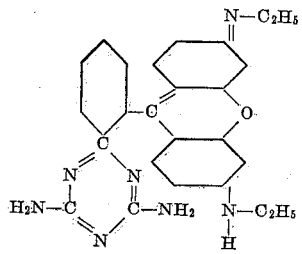

Forty parts of crude rhodamine 6GDN were dissolved in 240 parts of the ethyl ether of ethylene glycol and added to 2.3 parts of sodium dissolved in 60 parts of methanol. The salt which was formed was removed by filtration. To this solution of the dye was added 15 parts of biguanide dissolved in 80 parts of methanol. After standing several hours, the precipitated guanamine was filtered and purified by dissolving in boiling triethylene glycol followed by dilution with water. The product was a bright red amorphous powder melting at 326° C., the yield being about 84%.

EXAMPLE 4

4-N-4'- aminophenyl- 4''- aminobenzoguanamine dihydrochloride

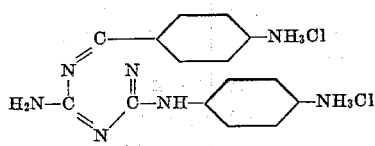

To a boiling suspension of 18 parts of 4-N-4'-nitrophenyl - 4'' - nitrobenzoguanamine in 160 parts of methanol was gradually added a solution of 88 parts of stannous chloride in 118 parts of concentrated hydrochloric acid from the top of the condenser. A mild exothermic reaction occurred, causing the suspension to gently boil without the application of external heat. The pale yellow solid also became bright canary yellow in color. After addition of all of the reducing agent, heating was continued for 15 minutes, during which time a pale yellow solution formed and a minute amount of bright orange solid separated. The hot solution was filtered through a sintered glass funnel from the orange solid, which was probably a complex tin salt. The solution was diluted with an equal volume of concentrated hydrochloric acid and cooled in an ice bath. A nearly colorless solid soon separated from solution. Before filtering, 150 parts of acetone were added to further decrease the solubility of the salt. The cold mixture was filtered and the solid washed with concentrated hydrochloric acid and then acetone. The yield of the product which was probably the dihydrochloride of the above formula was 76%.

EXAMPLE 5

4-aminocinnamoguanamine

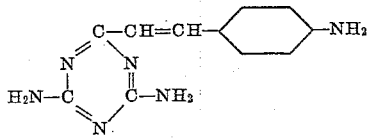

To a boiling suspension of 15.5 parts of 4-nitrocinnamoguanamine in 160 parts of methanol was gradually added, from the top of a condenser, a solution of 50 parts of stannous chloride dihydrate in 50 parts of concentrated hydrochloric acid. The flame was removed during the addition of the reducing agent as the reaction was exothermic. As the reaction proceeded the solid dissolved giving a dark colored solution. After all of the stannous chloride solution was added, the solution was refluxed for several minutes and then diluted with an equal volume of concentrated hydrochloric acid. Within a short time a pink solid separated from the solution. The mixture was cooled in an ice bath, the solid filtered on a porous glass filter, washed with concentrated hydrochloric acid to remove tin salts, and finally with acetone. The pink hydrochloride salt of 2-aminocinnamoguanamine was made into a thin paste with a small amount of water and an excess of sodium hydroxide solution added. The yellow solid was filtered, washed with water, and crystallized from hot water containing about 5% of the ethyl ether of ethylene glycol. The free base crystallized as fine, canary yellow needles, melting at 256–257° C. The yield was 66% of the theoretical.

What I claim is:

1. Amino-substituted polynuclear guanamines having the following formula:

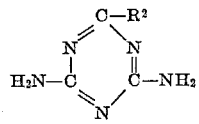

in which $R^2$ is an amino-substituted polynuclear aromatic radical and the bond between $R^2$ and the 2-carbon atom of the triazine ring is a carbon-to-carbon bond.

2. Amino-substituted aryl guanamines having the formula:

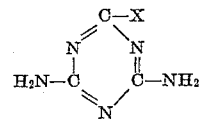

in which X is an amino-substituted xanthene radical, the bond between X and the 2-carbon atom of the triazine ring being a carbon-to-carbon bond.

3. A method of preparing an amino-substituted guanamine which comprises bringing about reaction between a biguanide and an ester of an amino-substituted aromatic carboxylic acid.

4. A method of producing amino-substituted aryl guanamines which comprises bringing about reaction between biguanide and an ester of an amino-substituted aromatic carboxylic acid.

5. A method according to claim 4 in which the reaction takes place in the presence of a lower monohydric paraffin alcohol as a solvent.

6. A method according to claim 3 in which the reaction takes place in the presence of a lower monohydric paraffin alcohol as a solvent.

JACK THEO THURSTON.

REFERENCES CITED

The following references are of record in the file of this patent:

UNITED STATES PATENTS

| Number | Name | Date |
| --- | --- | --- |
| 2,192,127 | Ebel | Feb. 27, 1940 |
| 2,197,357 | Widmer | Apr. 16, 1940 |

FOREIGN PATENTS

| Number | Country | Date |
| --- | --- | --- |
| 486,519 | Great Britain | May 1938 |
| 486,577 | Great Britain | May 1938 |
| 106,398 | Switzerland | Aug. 16, 1924 |

OTHER REFERENCES

Chemical Abstracts, vol. 35, p. 1126 (1941).

Ind. Eng. Chem., vol. 32, No. 9, p. 1184 (Sept. 1940).

Journal fur Prakt. Chemie, vol. 190 (1910), p. 532.